United States Patent [19]

Hasegawa

[11] E Re. 31,567

[45] Reissued Apr. 24, 1984

[54] AUTOMATIC CONTROL INDICATION DEVICE IN AN AUTOMATIC CONTROL TYPE ELECTRONIC FLASH UNIT

[75] Inventor: Hiroshi Hasegawa, Yokohama, Japan

[73] Assignee: Nippon Kogaku K.K., Tokyo, Japan

[21] Appl. No.: 401,536

[22] Filed: Jul. 26, 1982

Related U.S. Patent Documents

Reissue of:

[64] Patent No.: 3,999,193
Issued: Dec. 21, 1976
Appl. No.: 595,420
Filed: Jul. 14, 1975

[30] Foreign Application Priority Data

Jul. 20, 1974 [JP] Japan ..... 49-82751

[51] Int. Cl.[3] ..... G03B 7/16

[52] U.S. Cl. ..... 354/413; 354/127.11; 354/415

[58] Field of Search ..... 354/27, 32, 33, 34, 354/35, 60 R, 60 F, 60 E, 60 L, 127, 128

[56] References Cited

U.S. PATENT DOCUMENTS

| | | | |
|---|---|---|---|
| 2,953,675 | 9/1960 | Kluge et al. . | |
| 3,638,543 | 2/1972 | Kondo | 354/35 |
| 3,651,372 | 3/1972 | Uchida et al. | 354/127 |
| 3,706,911 | 12/1972 | Wilwerding | 315/158 |
| 3,814,985 | 6/1974 | Pecher et al. | 315/241 P |
| 3,917,395 | 11/1975 | Ogawa | 354/60 R |

FOREIGN PATENT DOCUMENTS

| | | |
|---|---|---|
| 1208184 | 12/1965 | Fed. Rep. of Germany . |
| 1940383 | 2/1971 | Fed. Rep. of Germany . |
| 2028759 | 12/1971 | Fed. Rep. of Germany . |
| 2060193 | 6/1972 | Fed. Rep. of Germany . |
| 2105211 | 8/1972 | Fed. Rep. of Germany . |
| 2152140 | 11/1973 | Fed. Rep. of Germany . |
| 44-23869 | 8/1969 | Japan . |
| 45-17330 | 7/1970 | Japan . |
| 47-5481 | 3/1972 | Japan . |
| 47-28684 | 8/1972 | Japan . |
| 47-17427 | 9/1972 | Japan . |
| 48-74839 | 10/1973 | Japan . |

*Primary Examiner*—Russell E. Adams

*Attorney, Agent, or Firm*—Fitzpatrick, Cella, Harper & Scinto

[57] ABSTRACT

In an automatic control type electronic flash unit having a light-sensing element for sensing reflection of light generated by an interior light discharge tube with the aid of charging current of a capacitor, light emission of the interior light discharge tube is automatically disconnected when the light-sensing element has sensed a predetermined quantity of light. The electronic flash unit includes means for indicating that light has been automatically controlled, first signal generating means for generating a first signal when the light-sensing element has sensed a predetermined quantity of light, and means for receiving the signal as input and for rendering the indicating means operative upon reception of the signal.

5 Claims, 3 Drawing Figures

AUTOMATIC CONTROL INDICATION DEVICE IN AN AUTOMATIC CONTROL TYPE ELECTRONIC FLASH UNIT

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates generally to equipment for automatic flash photography, and more particularly, to an indication device in an automatic control type electronic flash unit for indicating whether or not automatic control has taken place when the electronic flash unit has effected discharge light emission. By the term "automatic control" as used in the present specification, I mean that the electronic flash unit senses the reflected light from the subject focused upon and automatically cuts illumination to prevent overexposure.

2. Description of the Prior Art

Automatic control electronic flash units have heretofore been grouped into the serial control type and the parallel control type, and these usually have ready lights. First, in the serial control type electronic flash units, in order to ascertain whether automatic control had taken place, it was necessary to measure the time elapsed from the light emission of the electronic flash unit until the main capacitor thereof was charged to a light emission voltage, that is, until the ready light was turned on. However, such measurement has only been approximate and inaccurate.

Next, in the parallel control type electronic flash units, it was not possible to ascertain whether automatic control had taken place in spite of the presence of the ready light, since charges in the main capacitor were all discharged, even when the electronic flash unit effected no automatic control.

Whether or not an automatic control electronic flash unit has effected automatic control is related to whether or not photography has been properly performed and therefore accurate confirmation of it is desirable.

SUMMARY OF THE INVENTION

Accordingly, the present invention provides an indication device for indicating accurately and with certainty whether or not an automatic control electronic flash unit has effected automatic control. The present invention also provides an indication device for indicating accurately and with certainty, with the aid of a ready light, whether or not an automatic control electronic flash unit equipped with such ready light has effected automatic control and for enabling the user to make sure of it.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important therefore, that the claims be regarded as including such equivalent constructions as do not depart from the spirit and scope of the invention.

BRIEF DESCRIPTION OF THE DRAWINGS

Specific embodiments of the invention have been chosen for purposes of illustration and description, and are shown in the accompanying drawings forming a part of the specification wherein.

DESCRIPTION OF THE PREFERRED EMBODIMENTS

Figure 1:
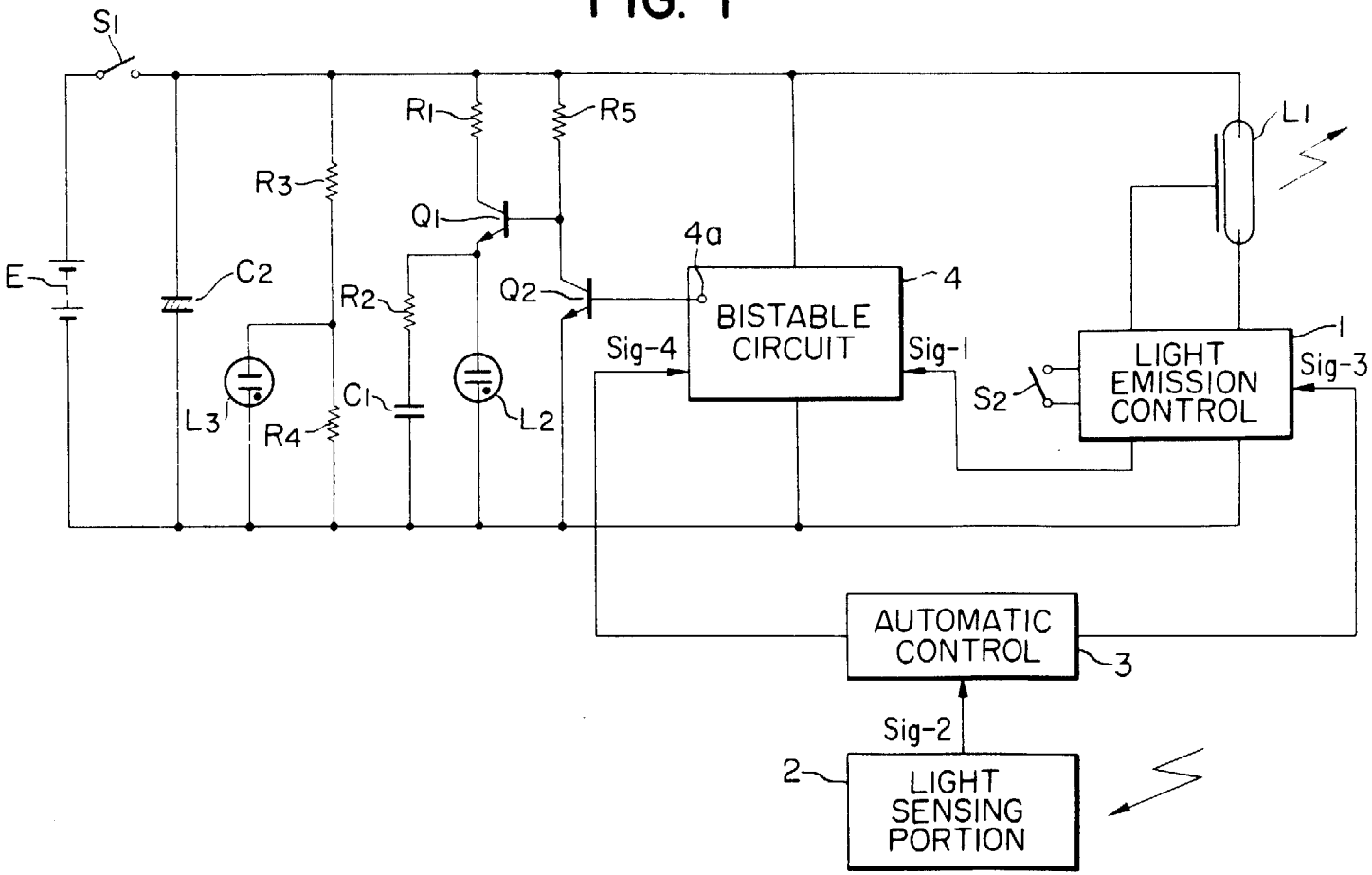
FIG. 1 is a circuit diagram showing a first embodiment of the present invention.

Referring to FIG. 1, a main capacitor C2 serves to supply power to a flashlight discharge tube L1 and may be charged by a power source E upon closing of a power switch S1. A light emission control unit 1 serves to control the discharge light emission time of the flashlight discharge tube L1 and may be operated upon closing of a synchro switch S2 to excite the discharge tube L1 to effect discharge light emission, whereafter it discontinues to discharge light emission of the flashlight discharge tube L1 upon reception of a light emission stop signal Sig-3 from an automatic control unit 3. The automatic control unit 1 may also generate a light emission start signal Sig-1 upon closing of the synchro switch S2. The automatic control unit 3 receives a signal Sig-2 generated by a light-sensing unit 2 which generates such signal when it has sensed a predetermined quantity of light emitted from the flashlight discharge tube L1 to illuminate an object and reflected thereby, and at that time, the automatic control unit 3 generates a light emission stop signal Sig-3 and an end-of-automatic control signal Sig-4.

A bistable circuit 4 receives as inputs the light emission start signal Sig-1 from the light emission control unit 1 and the end-of-automatic control signal Sig-4 from the automatic control unit 3, and controls a transistor Q2 having its base connected to the output terminal 4a of the bistable circuit 4. The collector of the transistor Q2 is connected to the junction between the base of a transistor Q1 and a resistor R5, and the emitter of the transistor Q2 is connected to the negative pole of the power source E. The collector of the transistor Q1 is connected to the positive pole of the power source through a resistor R1 and the emitter of that transistor is connected to an automatic control indication discharge tube L2 which indicates whether or not the automatic control electronic flash unit has effected automatic control.

Parallel-connected to the discharge tube L2 is an R-C circuit comprising a serial connection of resistor R2 and capacitor C1. Series-connected resistors R3 and R4 are connected across the main capacitor C2 to divide the voltage across the main capacitor. The resistors R3 and R4 are selected such that the divisional voltage derived thereby provides a maintenance voltage for a ready light discharge tube L3 when the main capacitor C2 has attained a light emission voltage. The ready light discharge tube L3 is connected across the resistor R4.

When the power switch S1 is closed to effect photography, the main capacitor C2 starts to be charged until it exceeds the light emission voltage, whereupon the ready light discharge tube L3 is turned on. Thereafter, when the synchro switch S2 is closed, the light emission control portion 1 causes the flashlight discharge tube L1 to effect discharge light emission while, at the same time, it applies the light emission start signal Sig-1 to the bistable circuit 4 causing the bistable circuit to render the transistor Q2 conductive. Thus, the transistor Q1 is by-passed and rendered non-conductive so that the capacitor C1 is not charged and the automatic control indication discharge tube L2 is not turned on. Also, the ready light discharge tube L3 is turned off dropping to a level below its maintenance voltage, since the flashlight discharge tube L1 is effecting its discharge light emission to cause a drop of the voltage across the main capacitor.

The light emitted from the flashlight discharge tube L1 illuminates an object and the reflected light from the object is sensed by the light-sensing unit 2. When the quantity of light sensed by the light-sensing unit reaches a predetermined quantity, the light-sensing unit applies the signal Sig-2 to the automatic control unit 3. The automatic control unit 3 in turn applies the light emission stop signal Sig-3 to the light emission control unit 1 to discontinue the discharge light emission of the flashlight discharge tube L1. Simultaneously therewith, the end-of-automatic control signal Sig-4 is applied to the bistable circuit 4, which is thereby reset to render the transistor Q2 non-conductive, and thus the transistor Q1 conductive to permit the capacitor C1 to be charged with a time constant determined by the resistors R1 and R2 and, when the charge voltage exceeds the discharge start voltage of the discharge tube L2, this discharge tube turns on and starts discharging, whereby the charges stored in the capacitor C1 discharge through the resistor R2. When the discharge tube L2 drops to a level below the maintenance voltage, it stops discharging and turns off, so that the capacitor C1 is again charged. The automatic control indication discharge tube L2 repeats such flashing operation until the transistor Q1 is rendered non-conductive, that is, when the bistable circuit 4 is set by the light emission start signal Sig-1, thus indicating that automatic control has been effected. If the automatic control was not effected, the end-of-automatic control signal Sig-4 would not be applied to the bistable circuit 4 so that the transistor Q1 would remain non-conductive and the discharge tube L2 would not be turned on, thus indicating that no automatic control had taken place.

Figure 2:
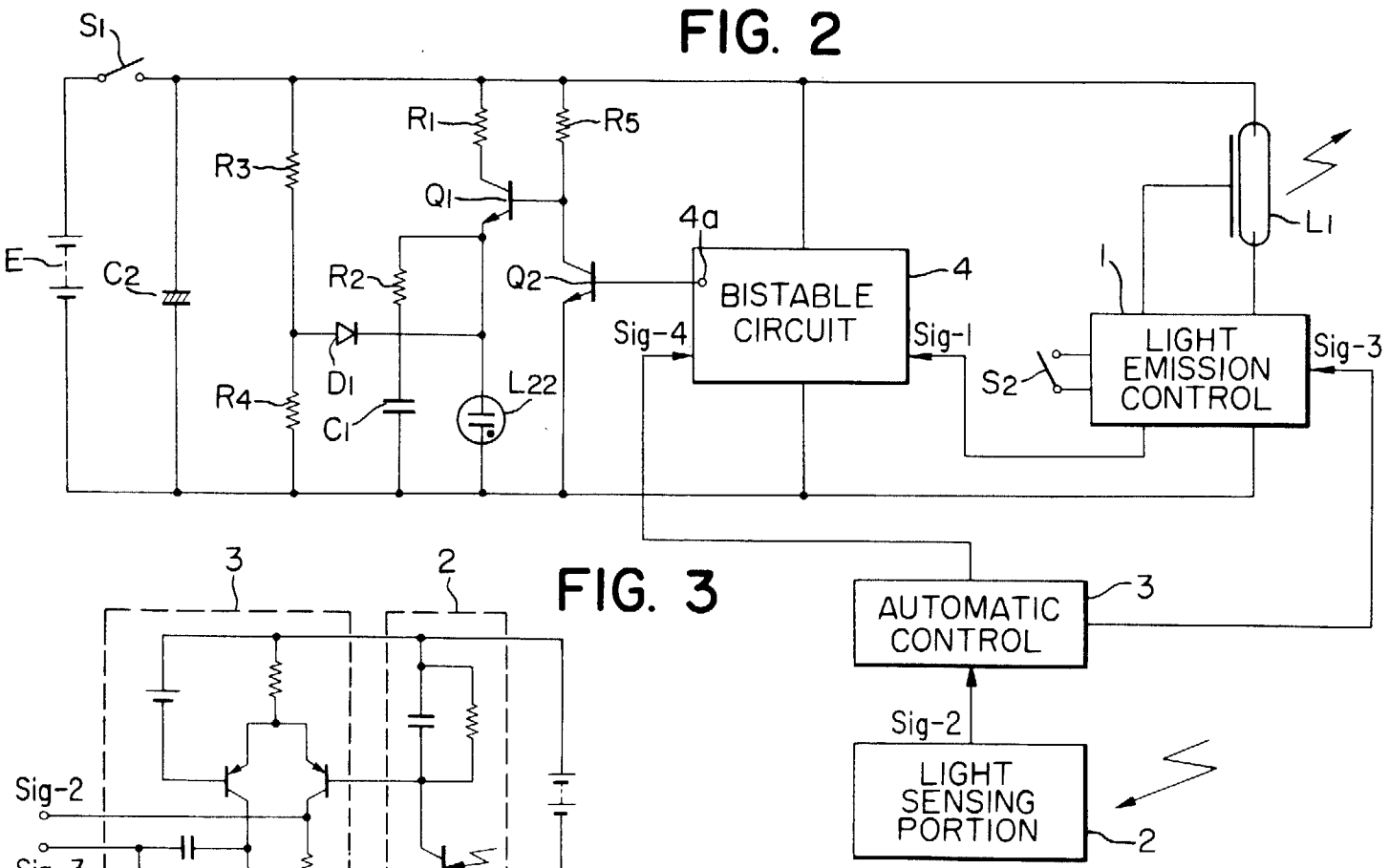
FIG. 2 is a circuit diagram showing a second embodiment of the present invention.

FIG. 2 shows a second embodiment of the present invention. In FIG. 2, the circuit elements which are functionally identical with those shown in FIG. 1 are given similar numerals and need not again be described. A discharge tube L22 serves both as the automatic control indication discharge tube L2 and the ready discharge tube L3 described in connection with FIG. 1. A diode D1 is connected between the junction between the voltage dividing resistors R3 and R4 and the emitter of the transistor R1, and serves to block reverse current. When the flashlight discharge tube L1 effects its discharge light emission, the light emission start signal Sig-1 is applied to the bistable circuit 4. As a result, the transistor Q1 is rendered non-conductive and the potential at the junction between the resistors R3 and R4 abruptly drops, so that the discharge tube L22 is turned off.

When the flashlight discharge tube L1 discontinues its light emission and the end-of-automatic control signal Sig-4 is applied to the bistable circuit 4, the transistor Q1 becomes conductive to permit the capacitor C1 to be charged, when the charging voltage of this capacitor exceeds the discharge start voltage of the discharge tube L22, this discharge tube turns on and starts discharging. Also, the capacitor C1 discharges through the resistor R2 and, when the charge potential thereof drops to a level below the maintenance voltage, the discharge tube L22 stops discharging and turns off. Such flashing operation is thereafter repeated to indicate that automatic control has been effected. When the main capacitor C2 is charged up to the light emission voltage, the divisional voltage derived by the resistors R3 and R4 exceeds the maintenance voltage of the discharge tube so that the discharge tube changes from its flashing state to its ON state, thus indicating that main capacitor C2 has been charged with the light emission voltage. When no automatic control has been effected, the end-of-automatic control signal Sig-4 is not applied to the bistable circuit 4 and accordingly, the transistor Q1 remains nonconductive and the discharge tube L22 effects no flashing, but when the main capacitor C2 has exceeded the light emission voltage, the discharge tube is only turned on to indicate that no automatic control has taken place.

Figure 3:
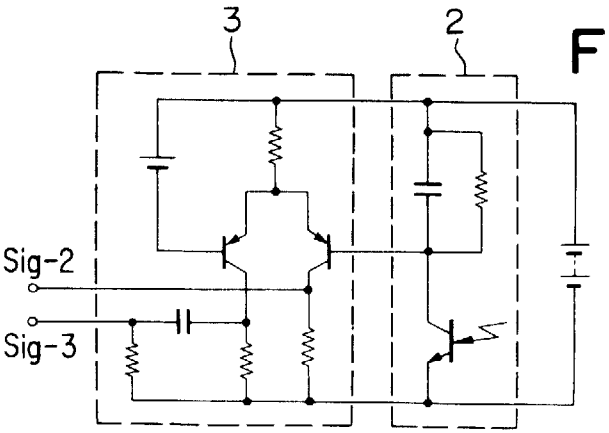
FIG. 3 is a circuit diagram specifically showing a light sensing portion and an automatic control circuit in the embodiments of the present invention.

As stated, FIG. 3 illustrates the light-sensing unit 2 and the automatic control circuit 3 shown in the embodiments of the present invention.

In the first and second embodiments of the present invention, as described above, charging-discharging of the C-R circuit is utilized to effect the flashing of the discharge tube when the automatic control electronic flash unit has effected automatic control, and therefore, if there is a drop of the power source voltage, the charging time of the capacitor in the C-R circuit will be correspondingly longer to slow down the flashing period of the discharge tube, whereby the drop of the power source voltage can also be indicated. While a discharge tube is employed as the automatic control indication element, any other known means may also be employed to effect such indication.

From the foregoing description it will be seen that the present invention can indicate whether or not the automatic control electronic flash unit has effected automatic control and thus, enables the user to determine whether or not there was any mistake in photography. Further, it will be seen that according to the embodiment of the invention as shown in FIG. 2, a single discharge tube acts both as the automatic control indication light and the ready light and this will be convenient for the automatic control electronic flash units the size reduction of which is desired. In addition, if an automatic control electronic flash unit having the automatic control indication device of the embodiment as shown in FIG. 2 is fitted to a camera having a ready light, a greater convenience will be enjoyed in that propriety of the automatic control could be determined by reference to such ready light.

I believe that the construction and operation of my automatic control indicating device will now be understood, and that the advantages thereof will be fully appreciated by those persons skilled in the art.

I claim:

[1. An automatic control type electronic flash unit which has a light-sensing element for sensing reflection of light generated by a flashlight discharge tube with the aid of charging current of a capacitor and which automatically discontinues light emission of the interior light discharge tube when the light-sensing element has sensed a predetermined quantity of light, said unit comprising:

means for indicating that light emitted by the flash unit has been automatically controlled;

first signal generating means for generating a first signal when said light-sensing element has sensed a predetermined quantity of light; and means for receiving said signal as input and for rendering said indicating means operative upon reception of said signal.]

[2. An automatic control type electronic flash unit according to claim 1, further comprising second signal generating means for generating a second signal when said interior light discharge tube emits light, and wherein said means for receiving said signal is a bistable circuit which receives said first and said second signal as inputs and renders said indicating means operative upon reception of said first signal and renders said indicating means inoperative upon reception of said second signal.]

[3. An automatic control type electronic flash unit according to claim 1, further comprising a time constant circuit for controlling said indicating means so that said indicating means during its operative condition indicates by flashing that automatic control has been effected.]

[4. An automatic control type electronic flash unit according to claim 1, further comprising means for detecting the charging voltage of said capacitor and for deactivating said indicating means when said charging voltage has reached a value necessary to effect light emission of said interior light discharge tube.]

[5. An automatic control type electronic flash unit according to claim 1, wherein said indicating means is a discharge tube.]

*6. An automatic control type electronic flash unit which has a light-sensing element for sensing reflection of light generated by a flashlight discharge tube with the aid of charging current of a capacitor and which automatically discontinues light emission of the flash light discharge tube when the light-sensing element has sensed a predetermined quantity of light, said unit comprising:*

*an indication element;*

*means for detecting a voltage of said capacitor;*

*first operative means for energizing said indicating element when said detecting means detects that said voltage has reached a predetermined value enough to ignite said flash discharge tube;*

*first signal generating means for generating a first signal when said light-sensing element has sensed a predetermined quantity of light; and*

*second operative means for receiving said first signal as input and energizing intermittently said indicating element after generation of flashlight of said flashlight discharge tube and before energization of said indicating element upon detection of said voltage.*

*7. An automatic control type electronic flash unit according to claim 6, wherein said indicating element is a ready light provided in a camera.*

*8. An automatic control type electronic flash unit according to claim 6, wherein said indicating element includes a neon tube; and said second operative means includes a CR time constant circuit connected in parallel with said neon tube, and switching means actuated in response to said first signal to supply power to said neon tube and said CR time constant circuit.*

*9. An automatic control type electronic flash unit according to claim 8, further comprising a uni-directional semiconductive element through which a voltage divided from the voltage of said capacitor is applied to said neon tube.*

*10. An automatic control type electronic flash unit according to claim 9, wherein said first operative means further includes means for generating a second signal when said flashlight discharge tube emits light, and a bistable circuit which receives said first and said second signals as inputs and renders said switching means operative upon reception of said first signal and renders said switching means inoperative upon reception of said second signal.*

* * * * *